United States Patent
Lin

(10) Patent No.: US 8,827,573 B2
(45) Date of Patent: Sep. 9, 2014

(54) PHOTOELECTRIC CONVERTER

(75) Inventor: I-Thun Lin, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 198 days.

(21) Appl. No.: 13/440,024

(22) Filed: Apr. 5, 2012

(65) Prior Publication Data

US 2013/0163924 A1 Jun. 27, 2013

(30) Foreign Application Priority Data

Dec. 21, 2011 (TW) .............................. 100147857 A

(51) Int. Cl.
*G02B 6/36* (2006.01)

(52) U.S. Cl.
USPC .......................................................... 385/89

(58) Field of Classification Search
USPC .......................................................... 385/89
See application file for complete search history.

(56) References Cited

U.S. PATENT DOCUMENTS

| | | | |
|---|---|---|---|
| 7,556,440 B2 * | 7/2009 | Birincioglu et al. ............ | 385/93 |
| 2013/0202256 A1 * | 8/2013 | Lin et al. ......................... | 385/89 |
| 2013/0259431 A1 * | 10/2013 | Charbonneau-Lefort et al. ............................... | 385/89 |
| 2013/0330044 A1 * | 12/2013 | Wu ................................. | 385/76 |

* cited by examiner

*Primary Examiner* — Sung Pak

(74) *Attorney, Agent, or Firm* — Novak Druce Connolly Bove + Quigg LLP

(57) ABSTRACT

A photoelectric converter includes a laser diode, a female optical transmission module, a male optical transmission unit, and a photo diode. The female optical transmission module includes a plurality of first lenses and a plurality of second lenses oriented at ninety degrees from each other, with total internal reflection between the two lenses. The female optical transmission module defines a detection cutout, from which the first lenses and the second lenses can be observed simultaneously. The photoelectric converter has a high reliability in signal transmittance.

12 Claims, 5 Drawing Sheets

PHOTOELECTRIC CONVERTER

BACKGROUND

1. Technical Field

The present disclosure relates generally to photoelectric conversion, especially to a photoelectric converter.

2. Description of Related Art

A photoelectric converter may include a laser diode for emitting a plurality of optical signals, a female optical transmission assembly, a male optical transmission assembly coupled with the female optical transmission assembly, and a photo diode. The optical signals emitted from the laser diode can enter the female optical transmission assembly, then transmitted through the male optical transmission assembly to the photo diode, and finally be converted into electrical signals by using the photo diode.

The female optical transmission assembly includes a plurality of first lenses formed on a bottom surface of the female optical transmission assembly, and a plurality of second lenses formed on a side surface perpendicular to the bottom surface thereof. The male optical assembly includes a plurality of optical fibers for coupling to the second lenses. The alignment of the male optical transmission assembly with the female optical transmission assembly must be precise to ensure the second lenses are precisely aligned with the optical fibers. Thereby, a receiving recess configured for receiving the male optical transmission assembly protrudes out from the side surface of the female optical transmission assembly. However, from the angle of view of the first lenses, the second lenses are hidden in the receiving recess, and the respective optical axes of the second lenses and the first lenses may not be observed to precisely coincide. In addition, it is difficult to ensure that the optical axis of a second lens is aligned with the optical axis of a first lens. This may result in poor signal transmittance of the photoelectric converter.

Therefore, there is room for improvement within the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
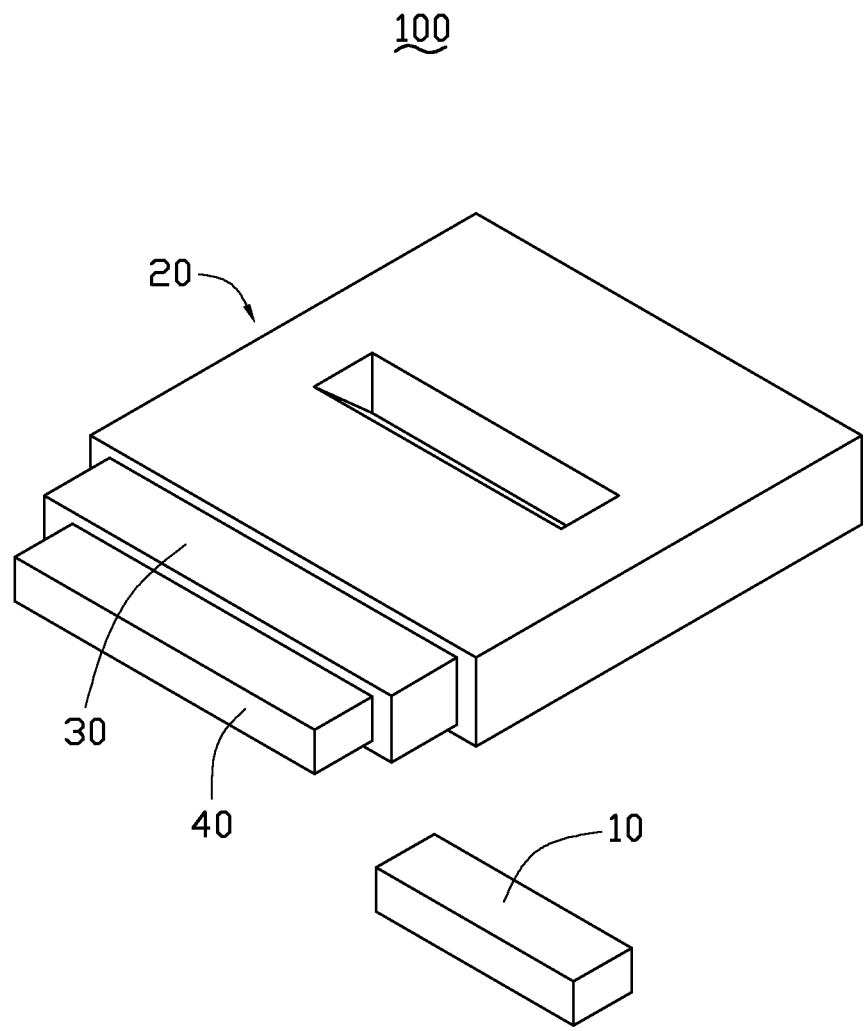
FIG. 1 is an isometric view of one embodiment of a photoelectric converter including a female optical transmission module.

Referring to FIG. 1, one embodiment of a photoelectric converter 100, configured for transmitting and converting a plurality of optical signals into electrical signals, includes a laser diode 10 for emitting the optical signals, a female optical transmission module 20 and a male optical transmission unit 30 for transmitting the optical signals, and a photo diode 40 for converting the optical signals to electrical signals. However, for simplicity, only the objects related to the female optical transmission module 20 are described herein.

Figure 2:
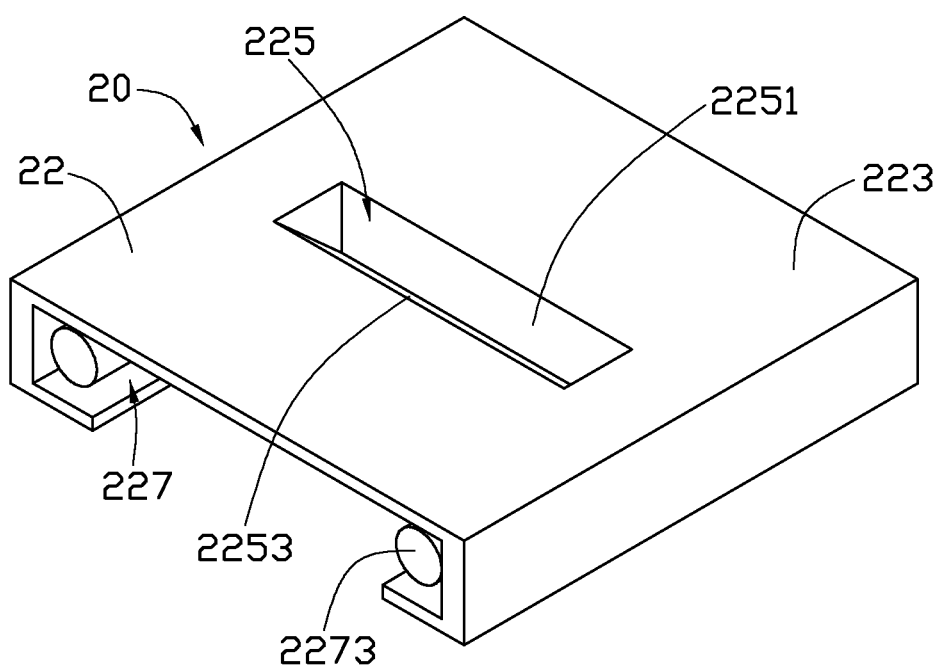
FIG. 2 is an isometric view of the female optical transmission module of FIG. 1.
Figure 3:
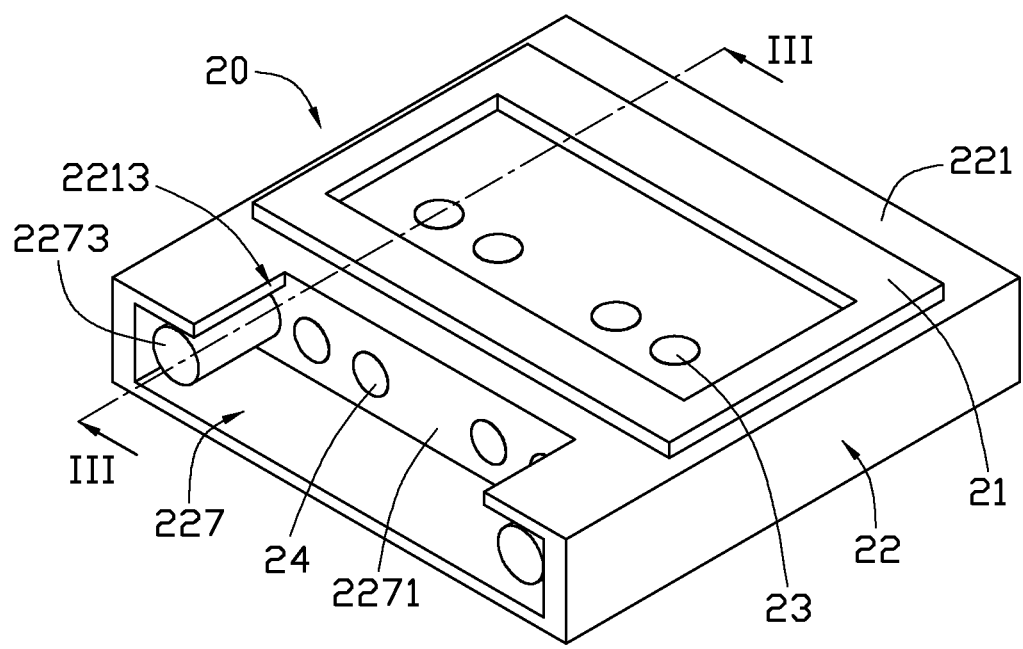
FIG. 3 is similar to FIG. 2, but viewed from another aspect.
Figure 4:
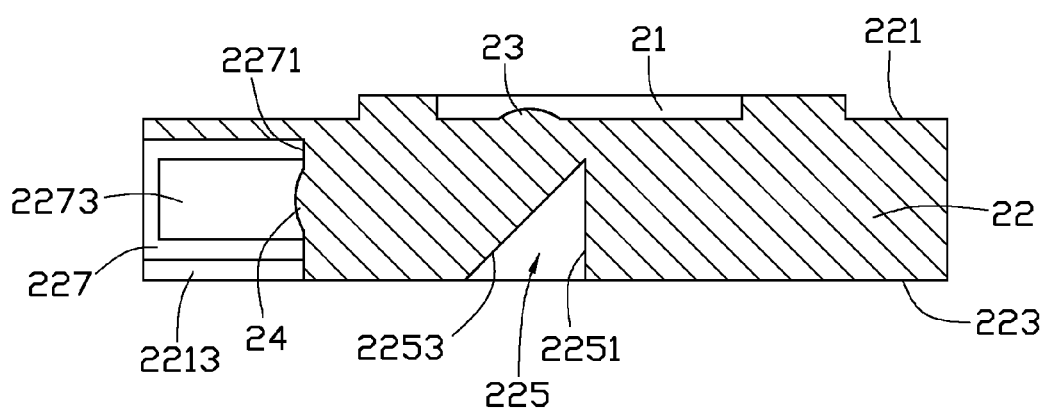
FIG. 4 is a sectional view taken along line III-III of the female optical transmission module of FIG. 3.

Referring to FIGS. 2, 3 and 4, the female optical transmission module 20 includes a supporter 21, an optical transmission body 22, a plurality of first lenses 23, and a plurality of second lenses 24. The first lenses 23 and the second lenses 24 are integrally formed with the optical transmission body 22. The supporter 21 is formed on a bottom of the optical transmission body 22 for supporting the optical transmission body 22 over the laser diode 10, and the optical transmission body 22 can receive and transmit the optical signals emitted from the laser diode 10.

The optical transmission body 22 is cuboid and includes a first surface 221 connected with the supporter 21 and a second surface 223 facing opposite from the first surface 221. The first lenses 23, which are aspherical and convex, are integrally formed and configured and arranged in a line on the first surface 221. Optical signals emitted by the laser diode 10 are gathered and converged by the first lenses 23.

The second surface 223 defines a geometric depression in the form of a reflection notch 225. The reflection notch 225 is located substantially in the middle of the second surface 223 corresponding to the line of the first lenses 23. The reflection notch 225 is a groove or notch, that is triangular in cross-section across the width of the groove or notch as shown in FIG. 3, and includes a first side surface 2251 and a second side surface 2253 connecting to the first side surface 2251. The first side surface 2251 is substantially perpendicular to the first surface 221, and an included angle is formed between the first side surface 2251 and the second side surface 2253, such that the optical signals converged by the first lenses 23 undergo total internal reflection onto the second side surface 2253, and the included angle is optimized to achieve this purpose. That is, the second side surface 2253 is configured for totally reflecting and redirecting the optical signals internally. In the illustrated embodiment, the optical transmission body 22 is made of highly reflective material, and the included angle between the first side surface 2251 and the second side surface 2253 is 45°.

The optical transmission body 22 defines a receiving recess 227 on an end or side surface facing away from the second side surface 2253. The receiving recess 227 is cuboid and is essentially a blind hole which includes a bottom surface 2271. The bottom surface 2271 is parallel to the first side surface 2251. The second lenses 24, which are also aspherical and convex, are formed on the bottom surface 2271 and configured and arranged in a line, and the individual placement of each second lens 24 is to correspond to each of the first lenses 23, respectively. Optical signals reflected by the second side surface 2253 are gathered and converged by the second lenses 24. Two position portions 2273 are formed on opposite sides on the line of the second lenses 24 for the precise mechanical engagement with the male optical transmission unit 30. In the illustrated embodiment, the position portions 2273 are a plurality of posts. The position portions 2273 may be other structures such as notches or grooves.

Figure 5:
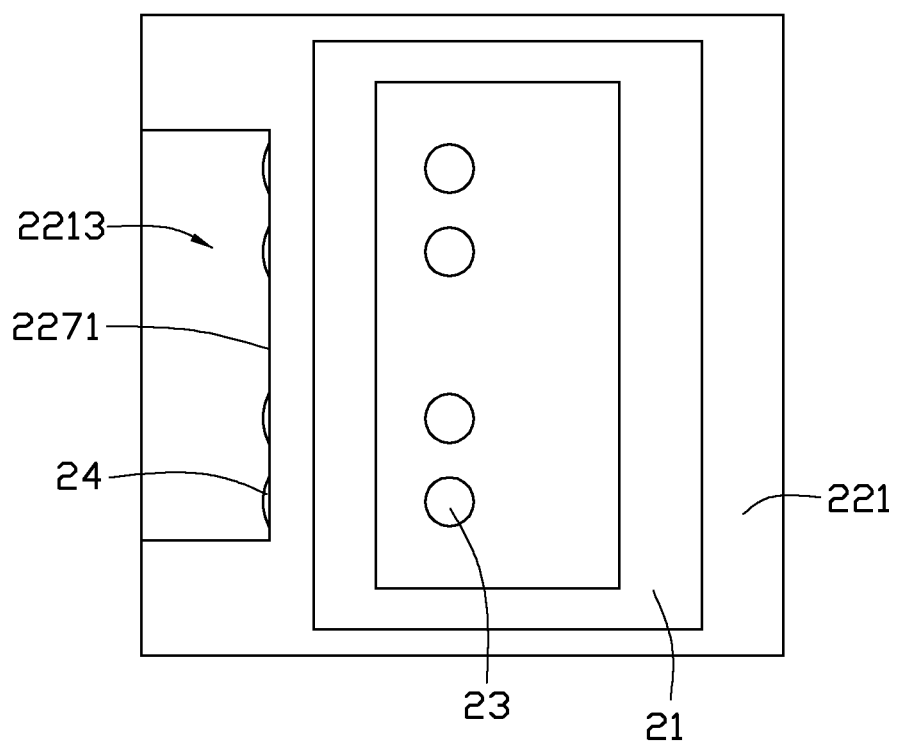
FIG. 5 shows a plan view of the female optical transmission module of FIG. 3.

The first surface 221 defines a detection cutout 2213 which provides asymmetry for ensuring correctness of connection with the male optical transmission unit 30. The detection cutout 2213 is substantially quadrate, and the detection cutout 2213 exposes the interior of the receiving recess 227. Thereby, the first surface 221 and the bottom surface 2271 can be observed simultaneously from a single angle of view, that is, the first lenses 23 and the second lenses 24 can be observed at the same time (referring to FIG. 5) at that angle of view. In the illustrated embodiment, the detection cutout 2213 allows the second lenses 24 to be observed. Both the position portions 2273 and the second lenses 24 can be observed through the detection cutout 2213. The detection cutout 2213 may be another shape, for example trapezoidal, so long as the viewing or observation of the second lenses 24 is possible through the detection cutout 2213.

In the illustrated embodiment, the number of the first lenses 23 is four and that of the second lenses 24 is four.

In using the photoelectric converter 100, the laser diode 10 emits optical signals towards the female optical transmission module 20. After being focused by the first lenses 23, the optical signals are reflected by the second side surface 2253 towards the second lenses 24; the optical signals are then gathered and converged by the second lenses 24 to be fed into the male optical transmission unit 30. The male optical transmission unit 30 carries the optical signals to the photo diode 40 for the conversion to electrical signals.

The coating of the second side surface 2253 with a reflective film or the mounting of a reflecting mirror on the second side surface 2253 ensures the total internal reflection of the optical signals.

In the photoelectric converter 100, since the optical transmission body 22 defines a detection cutout 2213 which allows inspection and viewability, the operations of the first lenses 23 and the second lenses 24 can be viewed simultaneously. The optical axes of the first and the second lenses 23, 24 can be observed to be, or not to be, exactly coincidental. The photoelectric converter 100 thus offers a high reliability in signal transmittance.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A photoelectric converter for transmitting and converting a plurality of optical signals, comprising:
   a laser diode for emitting the optical signals;
   a female optical transmission module for transmitting the optical signals, the female optical transmission module comprising an optical transmission body, a supporter positioned on a bottom of the optical transmission body, a plurality of first lenses and a plurality of second lenses;
   a male optical transmission unit engaged with the female optical transmission module for transmitting the optical signals; and
   a photo diode for converting the optical signals into electrical signals;
   wherein the optical transmission body comprises a first surface and a second surface opposite to the first surface, the first lenses are formed on the first surface, and the optical transmission body defines a receiving recess on a side surface connecting the first surface and the second surface; the receiving recess comprises a bottom surface, and the second lenses are formed on the bottom surface; the first surface defines a detection cutout exposing the interior of the receiving recess, and the first lenses and the second lenses are observed simultaneously via the detection cutout.

2. The photoelectric converter of claim 1, wherein the second surface of the optical transmission body further defines a reflection notch comprising a first side surface and a second side surface connecting to the first side surface, and the optical signals are totally internally reflected by the second side surface.

3. The photoelectric converter of claim 2, wherein the first side surface is perpendicular to the first surface, and an included angle between the first side surface and the second side surface is 45°.

4. The photoelectric converter of claim 1, wherein two position portions are formed on the bottom surface and positioned on opposite sides of the second lenses.

5. The photoelectric converter of claim 1, wherein the detection cutout is quadrate.

6. The photoelectric converter of claim 1, wherein the first lenses are aspherical and convex, and are integrally formed and configured and arranged in a line on the first surface; the second lenses are aspherical and convex, and are integrally formed and configured and arranged in a line on the bottom surface corresponding to the first lenses, respectively.

7. A female optical transmission module for transmitting optical signals, comprising:
   an optical transmission body;
   a supporter positioned on a bottom of the optical transmission body;
   a plurality of first lenses; and
   a plurality of second lenses; and
   wherein the optical transmission body comprises a first surface and a second surface opposite the first surface, the first lenses are formed on the first surface, and the optical transmission body defines a receiving recess on a side surface connecting the first surface and the second surface; the receiving recess comprises a bottom surface, and the second lenses are formed on the bottom surface; the first surface defines a detection cutout exposing the interior of the receiving recess, and the first lenses and the second lenses are observed simultaneously via the detection cutout.

8. The female optical transmission of claim 7, wherein the second surface of the optical transmission body further defines a reflection notch comprising a first side surface and a second side surface connecting to the first side surface, and the optical signals are totally internally reflected by the second side surface.

9. The female optical transmission of claim 8, wherein the first side surface is perpendicular to the first surface, and an included angle between the first side surface and the second side surface is 45°.

10. The female optical transmission of claim 7, wherein two position portions are formed on the bottom surface and positioned on opposite sides of the second lenses.

11. The female optical transmission of claim 7, wherein the detection cutout is quadrate.

12. The female optical transmission of claim 7, wherein the first lenses are aspherical and convex, and are integrally formed and configured in a line on the first surface; the second lenses are aspherical and convex, and are integrally formed and configured on the bottom surface corresponding to the first lenses.

* * * * *